United States Patent [19]

Gardner et al.

[11] Patent Number: 5,777,962
[45] Date of Patent: Jul. 7, 1998

[54] CALIBRATING AN OPTICAL DETECTOR TO MINIMIZE NOISE FROM UNDESIRED PERTURBATIONS IN DISK SURFACES

[75] Inventors: Timothy Stuart Gardner; Delbert Allen Hansen; Ronald Paul Stahl, all of Tucson, Ariz.

[73] Assignee: International Business Machines Corporation, Armonk, N.Y.

[21] Appl. No.: 723,155

[22] Filed: Sep. 30, 1996

Related U.S. Application Data

[62] Division of Ser. No. 250,320, May 27, 1994, Pat. No. 5,627,818, which is a continuation of Ser. No. 960,033, Oct. 13, 1992, abandoned.

[51] Int. Cl.[6] .................................................. G11B 7/095
[52] U.S. Cl. .............................. 369/44.27; 369/44.32; 369/54
[58] Field of Search ................... 369/13, 44.26, 369/44.27, 44.32, 54, 58, 272, 275.1, 275.3, 275.4; 250/202

[56] References Cited

U.S. PATENT DOCUMENTS

| | | | |
|---|---|---|---|
| 3,650,495 | 3/1972 | Boyer | 242/192 |
| 3,692,255 | 9/1972 | VonBehran | 242/192 |
| 4,093,961 | 6/1978 | Kanamaru | 369/58 X |
| 4,361,855 | 11/1982 | Igarashi | |
| 4,779,250 | 10/1988 | Kogure et al. | 369/13 |
| 5,036,505 | 7/1991 | Gleim | 369/44.32 X |
| 5,258,974 | 11/1993 | Ishimura et al. | 369/275.3 X |

FOREIGN PATENT DOCUMENTS

| | | |
|---|---|---|
| 2136612 | 11/1972 | France. |
| 62-295233 | 12/1987 | Japan. |
| 1552251 | 2/1977 | United Kingdom. |
| 90/14667 | 11/1990 | WIPO. |

OTHER PUBLICATIONS

Patent Abstracts of Japan, vol. 12, No. 107, P686, & JP 62-239330, Apr. 7, 1988.

Patent Abstracts of Japan, vol. 10, No. 154, P463, & JP 61-8746, Jun. 4, 1986.

*Primary Examiner*—W. R. Young
*Attorney, Agent, or Firm*—H. F. Somermeyer; R. M. Sullivan

[57] ABSTRACT

A magnetooptical disk recording device has a far-field detector for detecting radial position of a laser beam with respect to tracks on the disk. The far-field detector has a reference line dividing first and second photo detectors. The reference line is centered radially with respect to center lines of the tracks. The reference line is also center lengthwise to be tangentially center with respect to a tangential point on the track. The detector is adjustable both radially and tangentially. The tangential adjustment is based upon sensing two low reflective calibration marks on the disk that indicate centering the laser beam, hence the track tangent point, on the reference line. The calibration is based upon obtaining minimum noise in the detector output signal that signifies that the laser beam is centered on the length of the detector reference line. The calibration marks are in a mirror area disposed at one radial extremity of the disk. The marks are radially elongate and disposed in a radially outward diverge with respect to each other. The marks are disposed at 45 degrees with respect to two circumferentially spaced apart radial lines of the disk.

16 Claims, 2 Drawing Sheets

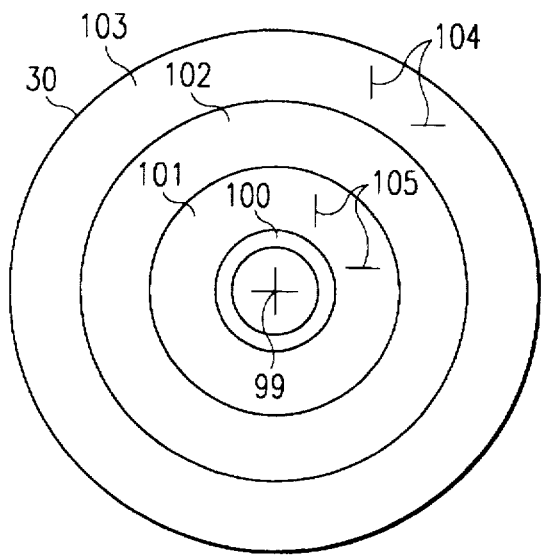
FIG. 2
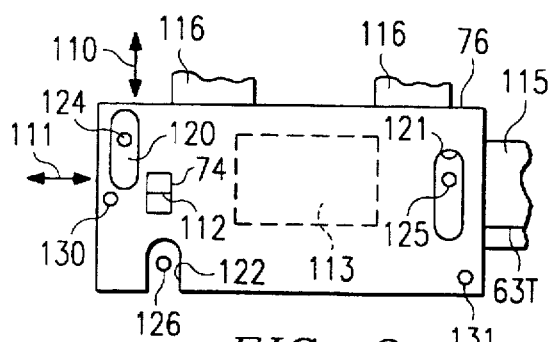
FIG. 3
FIG. 4
- 135 — MOUNT BOARD 76 ON HEAD FRAME
- 136 — ADJUST DETECTOR RADIALLY
- 137 — ADJUST DETECTOR TANGENTIALLY
- 138 — MEASURE NOISE IN TES
- 139 — MIN ?
- 140 — SECURE DETECTOR TO HEAD FRAME
FIG. 5
- 145 — MEASURE TES NOISE IN MIRROR AREA
- 146 — OK ?
- 147 — EXIT
- 150 — LOOSEN DETECTOR FOR ADJUSTMENT
- 151 — ADJUST DETECTOR TANGENTIALLY
- 152 — MEASURE NOISE IN TES
- 153 — MIN ?
- 154 — SECURE DETECTOR TO HEAD FRAME 5,777,962

CALIBRATING AN OPTICAL DETECTOR TO MINIMIZE NOISE FROM UNDESIRED PERTURBATIONS IN DISK SURFACES

RELATED APPLICATION

This application is a division of Ser. No. 08/250,320, filed May 27, 1994, now U.S. Pat. No. 5,627,818, that is a continuation of Ser. No. 07/960,033, filed Oct. 13, 1992, now abandoned.

FIELD OF THE INVENTION

This invention pertains to optical disk drives, more particularly to apparatus and methods related to adjustment of optical detectors for minimizing noise in detector generated signals caused by contaminants or other undesired disk surface perturbations.

BACKGROUND OF THE INVENTION

Optical disk drives employ a multi-element detector for generating a so-called track error signal (TES) that in other servo positioning systems is termed a position error signal. TES indicates relative position of a focused laser beam with respect to a center of a track, in most present day optical disks such track is a spiral groove formed in a disk substrate. One detector for generating TES is a far field detector that has two photo responsive elements. A line between the two elements is aligned tangentially with the spiral track (groove) and is preferably centered on the track center line. Such centering provides an accurate TES. The far field detector elements supply their respective signals to a differential amplifier that outputs a differential signal termed TES. TES can also be on two lines, one line connected to each of the elements. The signal amplitude difference of the signals on the two lines are a push-pull position error signal.

Tolerances for positioning a detector in an optical disk drive are relative to the size of the reflected laser beam being detected. In so-called near field (such as astigmatic detectors) detector the reflected laser beam is focussed to a small cross-sectional area making positional tolerances small. In contrast, a far field detector the reflected laser beam is focussed to have a larger cross-sectional area such that positioning tolerances for the detector are relatively large, such as an order of magnitude greater than in near field detectors. Such increased tolerances reduces sensitivity of the detector output signal, such as a track error signal, to thermal changes.

Also, to obtain a small size optical subassembly or head for an optical device, it is desired to use detectors that occupy small areas. This desire dictates that the photo element size in a detector have a smaller area than the cross-section of a reflected defocussed laser beam.

A problem in precise positioning of the focussed laser beam on a micron wide optical data-storing track or in precise optical track seeking operations arises from undesired surface contamination or perturbations that change reflectivity of the disk surface. Such disk surface perturbations can be in the millimeter and sub-millimeter size and yet cause sufficient noise in a tracking error signal (TES) to reduce disk drive performance. Such undesired changes in reflectivity (i.e. reduced reflectivity) have been found to cause a pair of areas of reduced reflected light intensity (shadows) in a far field light pattern of a reflected laser beam. Such far field light is used for optical disk tracking and seeking. It is believed that similar problems arise in near field light pattern of a reflected laser beam. One of the "shadows" is generated as the contaminant blocks or partially blocks some of the laser beam as the beam impinges on the contaminant as the laser beam enters the disk. A second "shadow" is generated by the reflected light beam traveling from the recording surface exiting the disk to return to the objective lens and the known detectors. The locations of the shadows remain balanced in the reflected laser beam as it travels through the objective lens into the optical system for detection. The shadows are centered about the optical axis of the reflected light beam. It has been discovered that if the far field detector that generates TES is not centered on the reflected light beam in a direction tangential to the optical track (groove) on the disk, then the shadows are imposed on the two photoelements of the far field detector asymmetrically or resulting in TES erroneous amplitudes. It is desired to overcome the above stated problem in a simple and effective manner.

DISCUSSION OF THE PRIOR ART

The U.S. Pat. No. 5,036,505 issued to Gleim shows readback circuits that adjust their operation to compensate for undesired surface perturbations, such as contaminants, on an optical disk. In contrast, the present invention provides for an adjustment of the tracking detector that centers a reflected beam on the tracking detector for compensating for noise induced into a tracking error signal TES by undesired surface perturbations.

The Takei et al Japanese published patent document 62-239330, published Oct. 20, 1987, based on application 61-81514 shows a read back circuit having a gate that opens and closes for generating a focus error signal in the presence of disk surface induced noise. Again, it is desired to provide an adjustment to a detector for minimizing signal noise induced by undesired surface perturbations.

Uejima in Japanese patent document 61-8746, published Jan. 16, 1986, shows spreading or distorting the reflected laser beam in a direction tangential to the track being followed, i.e. transversely to the line separating two photo elements of a tracking error detector. According to this patent document, the beam distortion reduces effects of signal noise induced by disk surface contaminations. In contrast, the present invention does not distort the reflected light beam for maintaining tracking accuracy, rather, the detector is adjusted tangentially to minimize signal noise effects caused by undesired surface perturbations.

SUMMARY OF THE INVENTION

An object of the present invention is to provide a detection system in an optical apparatus wherein a laser beam is centered radially and tangentially on a multielement detector for minimizing signal noised caused by scanning undesired surface perturbations, such as contaminants.

In accordance with the present invention an optical laser beam detector of an optical disk drive is symmetrically disposed with respect to the center of a track to be scanned by a laser beam and centered about a tangent point on such data storage track.

In accordance with one particular aspect of this invention, a tracking error detector is adjusted tangentially to minimize effects of undesired signal noise induced by surface perturbations and contaminants. A disk having low reflectance marks acting as pseudo contaminants, preferably in a so-called mirror area of an optical disk, are disposed on a disk usable with an optical disk drive. The laser beam of the optical device is caused to repeatedly traverse the pseudo contaminants. During such traversals, the detector tangential position is adjusted until the amplitude of the contaminant induced signal noise is minimum. Then the detector is secured in the adjusted position. In this aspect of the invention, the detector is adjustable both radially and tangentially with respect to data tracks on the disk.

In another aspect of the present invention, an optical disk drive has an optical detector tangentially adjusted to minimize signal noise from undesired surface perturbations. In yet another aspect of the invention, an optical disk having pseudo contaminants outside a recording area is provided for enabling adjusting detectors in an optical device for minimizing signal noise caused by undesired surface perturbations.

The foregoing and other objects, features and advantages of the invention will be apparent from the following more particular description of preferred embodiments of the invention, as illustrated in the accompanying drawings.

DESCRIPTION OF THE DRAWING

FIG. 2 diagrammatically illustrates an optical disk usable in the FIG. 1 illustrated drive and that incorporates one aspect of the present invention.

FIG. 3 is a simplified diagrammatic plan view of a subassembly constructed in accordance with an aspect of the present invention and usable in the FIG. 1 illustrated drive.

FIGS. 4 and 5 are flow charts showing initial and post-manufacturing checking and adjustment of the FIG. 3 illustrated subassembly in a drive constructed as shown in FIG. 1.

DETAILED DESCRIPTION

Figure 1:
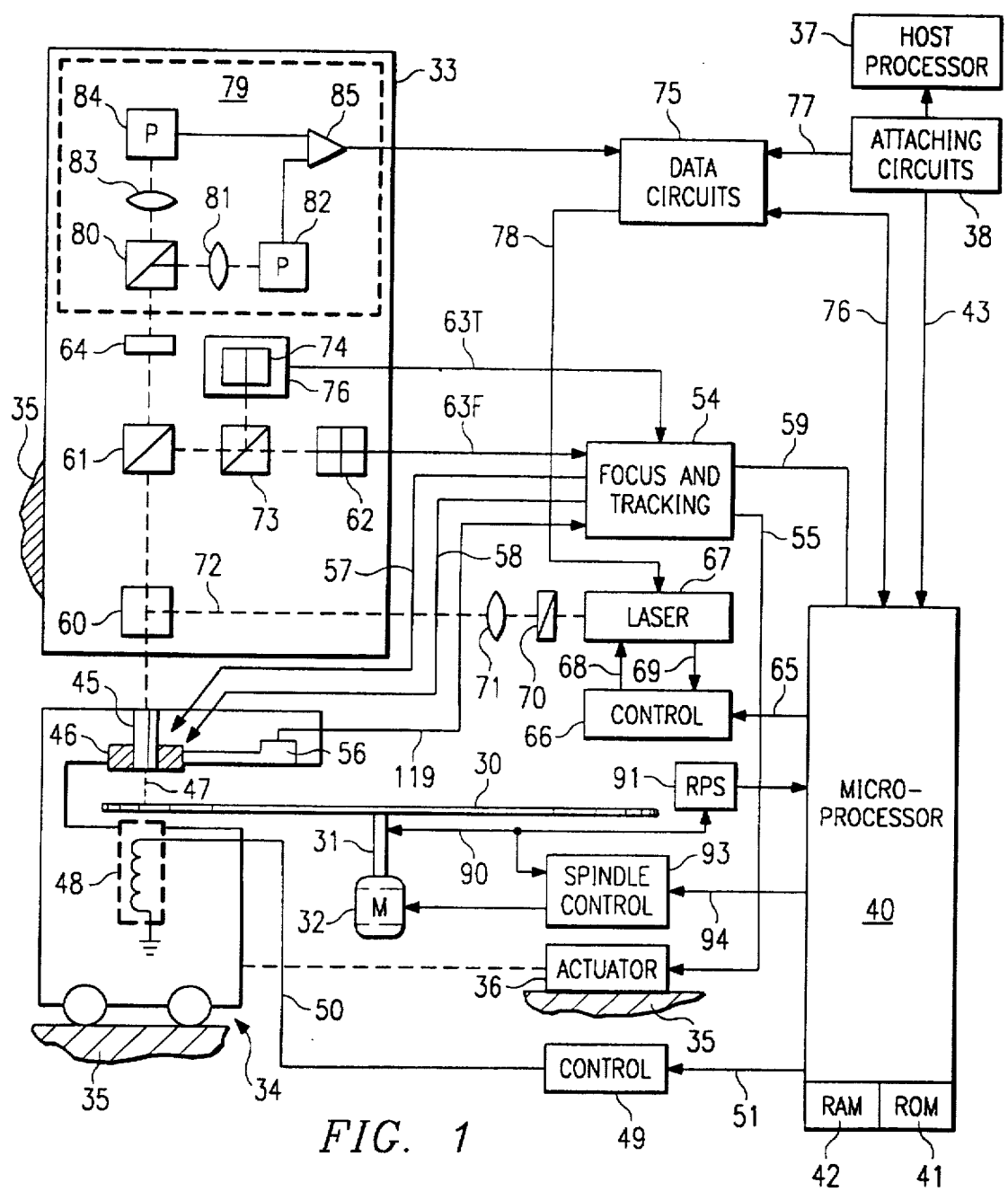
FIG. 1 illustrates an optical disk drive using the present invention in a simplified block-schematic diagram.

Referring now more particularly to the appended drawing, like numerals indicate like parts and structural features in the various figures. FIG. 1 illustrates a magnetooptical disk drive that incorporates the present invention. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumvolutions of a spiral track, preferably identified by a spiral groove in the disk 30 surface, for recording and recovering data on and from the disk. Linear actuator 36 suitably mounted on frame 35, radially moves carriage 34 for enabling track accessing. The recorder is suitably attached to one or more host processors 37. Such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on carriage 34 by fine actuator 46. Actuator 46 includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnetic bias field generating coil 48 during data writing or recording supplies a bias or steering magnetic field to disk 30 for directing remanent magnetization to the direction of the field. In a constructed embodiment electromagnet provides a weak magnetic steering or bias field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet coil 48 generated bias field to direct the remnant magnetization to a desired direction of magnetization as the spot cools below the Curie point temperature. Magnet coil 48 is shown as supplying a bias field oriented in the "write" direction, i.e., binary ones recorded on disk 30 normally are "north pole remnant magnetization". To erase disk 30, magnet coil 48 supplies a field so the south pole is adjacent disk 30. Magnet coil 48 control 49 is electrically coupled to magnet coil 48 over line 50 to control the write and erase directions of the coil 48 generated magnetic field. Microprocessor 40 supplies control signals over line 51 to control 49 for effecting reversal of the bias field magnetic polarity.

It is necessary to control the radial, transversely to a track, position of the beam following path 47 such that a track or circumvolution is faithfully followed longitudinally along its length for scanning the laser beam on path 47 along the length of the track. Also, precisely controlling the radial position enables a desired track or circumvolution to be quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 34 to create a relative position error (RPE) signal supplied to focus and tracking circuit 54 over line 119.

The focus position sensing is achieved by analyzing laser light reflected from disk 30 over path 47, thence through lens 45, through partially-polarizing beam splitter 60 and to be reflected by partially-polarizing beam splitter 61 to a so-called "quad detector" 62. Quad detector 62 has four photoelements which respectively supply signals on four lines collectively denominated by numeral 63F to focus and tracking circuits 54. Focusing operations are achieved by comparing the light intensities detected by the four photoelements in the quad detector 62. Tracking and seeking control is provided through beam splitter 73 directing a portion of the reflected laser light received from splitter 61 to split-photo or far-field detector 74 that is mounted on circuit board 76 adjustably supported by optical unit 33, as will become apparent. Detector 74 supplies the tracking error signal TES over line 63T to focus and tracking circuits 54. Aligning one axis of the detector 74 with a track center line, track following operations are enabled. Track following and seeking are performed in a usual manner.

In accordance with the present invention, detector 74 is positioned radially (transversely to the track) and tangentially (substantially along the track length, i.e. at a tangent to the circumvolution of the track) such that detector 74 center line 112 (FIG. 3) is tangential to the center line of the spiral track of disk 30 and the center of the laser beam is centered along the length of line 112. That is, the center of the reflected laser beam is centered on detector 74 in both the radial and tangential directions. Focus and tracking circuits 54 analyze the signals on lines 63F and 63T to respectively control focus and tracking.

Recording or writing data onto disk 30 is next described. It is assumed that magnetic field from coil 48 is switched to the desired polarity for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75 have ancillary circuits (not shown) relating to disk 30 format signals, error detection and correction and the like. Circuits 75, during a read or recovery action, strip the format signals and other non-data signals from the readback signals before supplying corrected data signals over bus 77 to host processor 37 via attachment circuits 38.

Reading or recovering data from disk 30 for transmission to a host processor requires optical and electrical processing of the laser light beam from the disk 30. That portion of the reflected light (which has its linear polarization from laser 67 rotated by disk 30 during readback using the Kerr effect) travels along the two-way light path 47 and through lens 45 and partially-polarizing beamsplitters 60 and 61 to the data detection portion 79 of the headarm 33 optics. Half waveplate 64, through suitable orientation of its fast axis, rotates the incident linear polarization through an angle of 45 degrees. Polarizing beamsplitter 80 transmits all light of one linear polarization orientation while reflecting all light of the orthogonal polarization orientation in such a way that when no Kerr effect is present, the power in both the transmitted and reflected beams are equal. The reflected and transmitted beams are focussed by lenses 81 and 83 onto photocells 82 and 94, respectively. Differential amplifier 85 subtracts the output signal amplitudes supplied by photocells 82 and 84.

When the reflected light is rotated by a "south" or erased pole direction remnant, the output of photocell 84 is slightly greater than the output of photocell 82 causing the differential amplifier 35 to create a signal of a certain polarity. When the reflected light is rotated in the opposite direction by a "north" or written pole direction, the output of photocell 82 is slightly greater than the output of photocell 84 causing the differential amplifier 85 to create a signal of the opposite polarity. This is termed "differential magneto-optic detection," and enables good common-mode rejection of variations in light intensity which contain no signal information. The amplifier 85 supplies the resulting difference signal (data representing) to data circuits 75 for detection. The detected signals include not only data that i.e. is recorded but also all of the so-called ancillary signals as well. The term "data" as used herein is intended to include any and all information-bearing signals, preferably of the digital discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

An optical disk constructed in accordance with the present invention is shown in FIG. 2. Such optical disk may be used solely as a calibration disk or may be a usual data storing disk having adjustment enabling pseudo contaminants in one of two mirror areas. The mirror areas are non-recording areas. No grooves are in the mirror areas, i.e. the mirror area is a planar reflecting light reflecting area. Disk 30 rotates about axis 99 via mounting hub 100. An inner diameter (ID) mirror area 101 (shown with a greater radial dimensions than desired for a practical embodiment) is disposed radially between hub 100 and annular data recording area 102. A spiral groove in area 102 is coated with magnetooptical material for forming a machine sensible data storing track, as is known. The outer diameter mirror area 103 is disposed radially between the disk periphery and annular recording area 102. The illustrated radial dimension of area 103 is enlarged while the radial dimension of area 102 is shown reduced for better illustrating the invention.

In an early embodiment of the invention pseudo contaminant markers 104 were affixed to the surface of disk 30 in area 103 substantially as shown. Markers 104 simulate contaminants for causing two shadows that are caused by a contaminant or other undesired surface perturbation that reduces reflectivity of the disk. A radial inward end of the two elongated markers are circumferentially spaced apart. Also, the elongated markers 104 were disposed at about 45° from two respective radial lines at predetermined locations in the markers 104, such as at the radially inward ends of the two markers. The circumferential edges of markers 104 cause two shadows in the reflected laser beam to simulate a contaminant, as will as other undesired surface perturbations. The length of markers 104 is best empirically determined in that the length of the markers 104 are longer than the diameter of a defocussed laser beam such that the entire beam always scans the markers, as later described. As an example, the width of each pair of markers 104 was approximately one millimeter with a length of several millimeters, no limit thereto intended. The circumferential width of markers 104 is not critical.

Markers 105, constructed similarly to markers 104, are similarly disposed in inner diameter mirror area 101. Either or both sets of markers 104 and 105 may be used to control tangentially adjusting detector 74 as will become apparent. In practicing the preferred embodiment of the invention, laser beam travelling over path 47 to either mirror area is focussed on the mirror region or area 101/103 (also area 165 of FIG. 6) resulting in an out-of-focus beam at the outwardly facing surface 166 (FIG. 6) of the media substrate 161 (FIG. 6) with a cross-section diameter in the millimeter range. In the preferred embodiment the lengths of each marker 104 or 105 is greater than the cross-sectional diameter of the laser beam as it shines onto either mirror area 101 or 103. Therefore, each marker 104, 105 has a length along the radius of the disk of more than one millimeter. The width (circumferential extent) of each marker is not critical. The description of FIGS. 4 and 5 indicate the reasons for the above statements.

To cause the laser beam to scan markers 104, the coarse actuator carriage 34 is first positioned at an outer radial position and locked in that position, i.e. carriage 34 will not move radially. Similarly for scanning markers 105 with the laser beam, carriage 34 is locked in position at a radially inward position. The fine actuator 46 is locked in focus on the media mirror surface 165 (FIG. 6) by focus and tracking circuits 54. The radial position of fine actuator is locked at a center position of its radial range for maintaining the laser beam at one radial position. This fixed positioning avoids requiring any track following—i.e. there are no grooves in the mirror area to follow. Therefore, the laser beam is radially positioned to always scan the markers 104/105 respectively in the outer or inner mirror areas. As such, the laser beam scans the markers once each disk rotation. Further, since the markers in each pair of markers 104/105 are disposed at 45° with respect to two radial lines, the marker induced noise has both a positive and negative excursion giving an indication of direction of misadjustment of detector 74 that results in a minimal noise effect on track following.

FIG. 3 illustrates detector subassembly circuit board 76 in a simplified diagrammatic inverted plan view. Board 76 is adjustably mounted for movement radially of disk 30 and in a transverse direction tangential to the optical disk track (not shown). The two-way adjustment enables precisely positioning detector 74 such that the reflected laser beam is centered on detector 74 both radially and tangentially. Detector 74 is mounted on board 76 such that its center line 112 between its two photo sensors (not numbered) is aligned with the radial direction of disk 30, as represented in FIG. 3 by double-headed arrow 110. Double-headed arrow 111 represents the tangential direction of the spiral track (groove) of disk 30, as is known. Flat flexible cable 115 attached to circuit board 76 includes line(s) 63T to carry the detected track position error signal from detector 74, as processed in integrated circuit module 113 (shown as dashed line as circuit module 113 is on a surface of board 76 that faces away from the illustrated surface supporting detector 74. The electrical circuit connections are not shown in FIG. 3. A pair of flat flexible cables 116 also extend from board 76 to other circuits of the FIG. 1 illustrated device, such as for providing electrical power to board 76. Optics 33 are mounted on frame 35 as an assembly. Board 76, in turn, is adjustably mounted on the assembly frame (not separately shown but represented by the box enclosing the optical elements of optics 33) of optics 33 as described below.

The radial adjustment of detector 74 is achieved by moving board 76 in the directions of arrow 110 for moving board 76 radially with respect to the track center line. To this end, three elongated slots 120–122 are formed in board 76 in a manner to provide a triangle. In the prior art the width of slots 120–122 closely approximated the diameter of fasteners 124–126, respectively, for minimizing tangential skewing of board 76 during radial alignment of line 112 with a track center line. Fasteners 124–126 include a head that has an extent greater than the width of elongated slots 120–122. Such fasteners may be self-tapping screws, bolts with lock nuts, and the like.

Elongated slots 120–122 have a width substantially greater than the diameter of fasteners 124–126. This additional width enables moving circuit board 76, hence detector 74, along the center line 112, i.e. tangentially to the track center line. Of course, the heads (not shown) on the fasteners 124–126 have an extent to maintain gripping contact with board 76 for each and every tangential adjustment position.

For facilitating manual and automatic adjustment of board 76, datum or reference holes 130–131 are provided. A tool (not shown) is inserted into holes 130–131 for accomplishing both the radial and tangential adjustments. The details of the tool are not important to reaching an understanding of the present invention.

Referring next to FIG. 4, initial adjustment of detector 74 in the FIG. 1 illustrated device is briefly described. Step 135 mounts circuit board 76 on the optics 33 frame (i.e. head frame). A tool is suitably inserted into datum holes 130 and 131 for precisely moving board 76 with respect to the head frame. In a manual adjustment, the signal on line 63T is supplied to an oscilloscope. An operator then moves board 76 with a hand tool for achieving the below described results. In an automatic system, the line 63T signal is supplied to an analyzer (not shown) that in turn controls a robot (not shown) for moving board 76 as below described. The design of either a manual system or automatic system is well within the capabilities of one of ordinary skill for practicing the present invention.

After board 76 is mounted (or loosened if already installed) preparatory to the initial adjustment, carriage 34 is moved radially to a maximal radially outward position and kept locked in one radial position. Fine actuator 46 is locked at its center position(not shown) of its range of radial motion. Objective lens 45 is focussed on the mirror surface 162 (FIG. 6) resulting in an out-of-focus beam condition at the outer surface 166 of the media substrate 161 such that the beam cross section at the outer surface 166 has a diameter on the order of a millimeter.

At step 136, board 76 is adjusted radially along the lengths of the elongated slots 120–122 in a known manner. After centering line 112 at a track center line, the tool maintains the radial position. At steps 137–139 the tangential adjustment is achieved that centers the reflected laser beam on detector 75 in the tangential direction. The adjustment may require several steps, i.e. several executions of the process loop 137–139 for finding the lowest amplitude of TES as the laser beam in path 47 circumferentially traverses marks 104/105 while tracking and following circuits 54 are in the focus mode. Upon finding the minimum TES noise signal (min) at step 139, then board 76, hence detector 74 are secured at that position.

In a similar manner, after the FIG. 1 illustrated device is in the field, FIG. 5 illustrates the procedures for verifying the initial adjustment of FIG. 4 or for tangentially adjusting board 76 on an optical drive that is not so adjusted. Step 145 measures the TES noise amplitude from marks 104/105. If the sensed amplitude is within predetermined specifications (empirically determined), then from branch step 146 the procedure is exited for indicating a drive that has been adjusted in accordance with this invention. Otherwise, if the specifications are not met, then step 150 loosens fasteners 124–126 for permitting adjustment of board 76 position. Steps 151–153 perform the functions described for steps 137–139 of FIG. 4. Upon obtaining a minimum noise signal amplitude, step 154 secures board 76 in the adjusted position.

Figure 6:
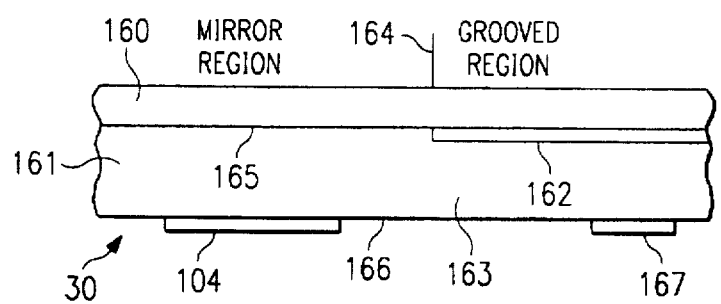
FIG. 6 diagrammatically illustrates a partial cross-section of an optical disk for showing surface contaminates and a structure used in adjusting the FIG. 1 illustrated drive in accordance with the present invention.

FIG. 6 diagrammatically illustrates a partial radial cross-section of disk 30. Disk 30 includes a recording layer 160, such as of magnetooptical material supported on transparent substrate 161. The recording area of disk 30 includes a spiral groove represented by rectangle 167 that constitutes a grooved region of disk 30 ending at circumferential line 164. Such grooved area 162 typically has a spiral groove of a radial extent in the micron range. Mirror region having a flat reflective surface 165 facing the outer annular surface 166 of substrate 161 is usually designated as not being used for recording data. According to this invention, annular mirror area 165 is used to adjust detector 74 tangential position to minimize noise effects of surface perturbations/contaminants 167 that may occur on outwardly facing annular surface 166. Markers 104 are suitably secured to outwardly facing surface 166 in a superposed relation to mirror surface 165, such as also seen in FIG. 2. As shown in FIG. 2, markers 104 and 105 can be respectively at a radially outward or inward of recording or grooved area 162, denoted by numeral 102 in FIG. 2. Therefore, the FIG. 6 showing is generic to using either a radially inward or outward mirror area 101 or 103 of FIG. 2. The laser beam on path 47 (FIG. 1) has a cross-section at outwardly-facing surface 166 while being focused to a predetermined focus condition at mirror surface 165. Contaminant or perturbation 167 can be in the millimeter or sub-millimeter size, as mentioned above.

While the invention has been particularly shown and described with reference to preferred embodiments thereof, it will be understood by those skilled in the art that various changes in form and details may be made therein without departing from the spirit and scope of the invention.

What is claimed is:

1. In a method of adjusting an optical device for minimizing effects of shadow-causing surface perturbations on an optical surface of an optical member, the optical device having a laser supplying a laser beam to the optical surface of said optical member, the optical member having an optically sensible elongated groove opening at said surface, said elongated groove longitudinally extending on the optical surface and having a predetermined width at said optical surface, the optical surface reflecting the supplied laser beam as a reflected beam that is modulated by said elongated groove for indicating by such modulation a relative position of the supplied laser beam transversely to the elongated groove, mount means in the device for mounting an optical detector for position adjustments along and transverse to said elongated groove, said detector receiving said reflected laser beam for generating an electrical signal indicative of a predetermined sensed relative transverse position to the elongated groove;

the steps of:

selecting said member to have an optical surface with shadow-creating marker means that simulates undesired surface perturbations;

selecting said shadow-creating marker means to have an extent transverse to said elongated groove that is substantially greater than said predetermined width of said elongated groove;

relatively moving said optical member with respect to said mount means and to said detector as a predetermined relative movement, actuating the laser to supply the laser beam to scan said marker means during said predetermined relative movement;

in a receiving and measurement step, receiving said reflected laser beam at said detector as the laser beam is scanning said marker means, in a noise measurement means connected to said detector, measuring and indicating an amplitude of signal noise introduced into said reflected laser beam as a noise signal;

repeatedly moving said detector with respect to said mount means in a direction along said elongated groove and after each said predetermined relative movement, performing said receiving and measurement step until said receiving and measurement step indicates a minimum amplitude noise signal output from the detector; and securing the detector on said mount means against movement relative to said mount means at the position resulting in said minimum amplitude noise signal output.

2. In the method set forth in claim 1, further including the steps of:

selecting said marker means to comprise two spaced-apart low-reflectance elongated low-reflectance marker members respectively disposed at about 45 degrees with respect to a line of the member disposed intermediate said marker members and extending transversely to said elongated groove.

3. In the method set forth in claim 1 wherein said optical surface has separate grooved and mirror surface areas, said elongated groove being in said grooved surface area, further including the steps of:

in said selecting step, selecting said member to have said marker means disposed completely on said mirror surface area; and before scanning said marker means, radially moving the laser beam to said mirror surface area of the optical surface for scanning said marker means in a scanning path substantially parallel to said elongated groove.

4. In the method set forth in claim 3, further including the steps of:

making the lengths of each of said marker means longer than a cross-sectional extent of said reflected beam as received at said detector.

5. In the method set forth in claim 1, further including the steps of:

before performing said steps of repeatedly moving the detector longitudinally along said elongated groove and receiving the reflected beam, adjusting the detector to be centered on the elongated groove in a direction transverse to the elongated groove.

6. In the method set forth in claim 1, further including the steps of:

selecting said optical device to be an optical disk recorder having an optical disk mounted therein for rotation about an axis of rotation of said optical disk in the device, said disk having at least one substantially circular machine sensible track;

selecting said elongated groove to be substantially circular and centered radially at and extending circumferentially co-extensively to said machine sensible track; and before performing said receiving and repeatedly moving steps, centering the detector radially on said elongated groove.

7. In the method set forth in claim 6, further including the steps of:

in said selecting step, selecting said optical disk to have said mirror surface area disposed at one radial extremity of the disk and having a radial extent greater than a first predetermined radial distance; and before performing said actuating step, moving the laser beam to said mirror surface area and restricting radial movement of the laser beam in the mirror area to a predetermined radial distance that is shorter than said predetermined width.

8. In the method set forth in claim 7 further including the steps of:

said marker means having first and second radially elongated marker means disposed on said mirror surface in a radially outwardly diverging relationship, each of said elongated members having a length greater than said first predetermined radial distance and being disposed at a predetermined angle with respect to a radial line of said disk and disposed circumferentially between said marker means.

9. In the method set forth in claim 8, further including the steps of:

selecting said predetermined angle to be 45 degrees; and making said marker means black for minimizing reflectance thereof.

10. In the method set forth in claim 9, further including the steps of:

selecting said optical disk to have a magnetooptical recording layer disposed in a plane extending transverse to an axis of rotation of the optical disk and having a transparent coating coextensive to the recording layer such that said laser beam axially traverses the transparent coating to impinge on the magnetooptical layer.

11. An optical device having a detector adjusted as set forth in claim 1, said optical device being a disk device, said optical member being an optical disk;

optical means for receiving the laser beam from said laser for directing and focussing the laser beam onto said optical disk, said optical disk having a recording surface for reflecting said laser beam as a reflected beam to said optical means, said optical means receiving said reflected laser beam from the optical disk for directing the reflected laser beam to said detector, said detector having a plurality of photo elements and a reference axis disposed between two of the photo elements, means supporting the optical disk in the device for rotation about an axis of the disk and such that said surface of the disk is disposed to receive said laser beam from the optical means, said optical means including means for moving the laser beam radially of the disk, and said optical disk having at least one substantially circular machine sensible track co-extensive with said elongated groove.

12. The disk device set forth in claim 11, further including, in combination:

said reference axis being aligned radially of the disk with a center of said track and tangentially of the track such that a center of the laser beam is at a tangent point of the track.

13. The disk device set forth in claim 12, further including, in combination:

means mounting said detector in said device for adjustments radially of the disk and tangentially of the track.

14. The disk device set forth in claim 11, further including, in combination:

said optical disk having an outer annular planar surface and an annular interior recording layer disposed a predetermined axial distance from said outer annular planar surface;

means in the optical means for focussing the laser beam to a predetermined focus condition at said recording layer that causes the laser beam to have a predetermined cross-sectional area on said annular planar surface; and said detector being a far-field detector having an areal extent less than said predetermined cross-sectional area of the laser beam at said annular planar surface.

15. The disk device set forth in claim 11, further including, in combination:

said optical disk being a magnetooptical disk having a transparent substrate with an annular outer surface;

a recording layer on the substrate interior of said magnetooptical disk and axially disposed from said annular outer surface, said recording layer having a mirror area with a high reflectance surface, the mirror area having a first predetermined radial dimension and disposed at one radial extremity of said recording layer in said magnetooptical disk; and said shadow-creating marker means comprising two circumferentially-spaced-apart low reflectance elements disposed on said annular outer surface radially aligned with said mirror area.

16. The disk device set forth in claim 15, further including, in combination:

means in the optical means for focussing the laser beam to a predetermined focus condition at said mirror area of said recording layer such that the laser beam has a second predetermined radial cross-sectional dimension at said annular outer surface;

said second predetermined radial dimension being less than said first predetermined radial dimension; and each of said low reflectance elements having a length less than said second predetermined radial dimension and being spaced apart in a radially outwardly diverging position with respect to each other.

* * * * *